United States Patent Office 3,759,807
Patented Sept. 18, 1973

3,759,807
PHOTOPOLYMERIZATION PROCESS USING COMBINATION OF ORGANIC CARBONYLS AND AMINES
Claiborn Lee Osborn, Charleston, and David John Trecker, South Charleston, W. Va., assignors to Union Carbide Corporation, New York, N.Y.
No Drawing. Continuation-in-part of applications Ser. No. 794,752, Jan. 28, 1969, Ser. No. 838,460, July 2, 1969, and Ser. No. 69,128, Sept. 2, 1970, all now abandoned. This application Jan. 19, 1972, Ser. No. 219,171
Int. Cl. C08d 1/00; C08f 1/16
U.S. Cl. 204—159.23  6 Claims

ABSTRACT OF THE DISCLOSURE

Various combinations of certain organic carbonyl photosensitizer compounds and certain organic amine activators exert an unexpected beneficial effect on the photopolymerization of certain polymerizable monomers or oligomers and coating compositions containing the same. The suitable carbonyl compounds contain a ketonic oxygen, for example one can use acetophenone or xanthone, and the amines can be primary, secondary or tertiary amines, for example, one can use butyldiethanolamine, triethanolamine, di-n-butylamine or morpholine.

This application is a continuation-in-part of Ser. No. 794,752, filed on Jan. 28, 1969, Ser. No. 838,460, filed on July 2, 1969, and Ser. No. 69,128, filed on Sept. 2, 1970, all by Claiborn L. Osborn and David J. Trecker, now abandoned.

BACKGROUND OF THE INVENTION

This invention relates to improvements in the methods for the photopolymerization of monomers or oligomers when such compositions are exposed to light radiation having wavelengths of from about 2,000 A. to about 5,000 A. or longer.

It is known that certain monomers and oligomers can be polymerized by exposure to different types of light energy and that such reactions may be accelerated by the presence in the reaction mixtures of known photosensitizers, including azo compounds, ketones, peroxides, organic sulfur compounds, organic dyes, metal carbonyls, etc. The problem still exists, however, of obtaining a commercially acceptable rate of reaction. While some commercial use has been made of light radiation processes, they have not gained the wide acceptability that is desired. This has been a result mainly of the inability to achieve a fast enough reactivity and the poor economics resulting from the low efficiencies of the light energy that is usefully used in the reactions.

STATEMENT OF THE INVENTION

It has now been found that certain combinations of photosensitizers and activators unexpectedly increase the rate at which certain ethylenically unsaturated monomers or oligomers will polymerize. It has been found that these increased rates are achieved only when the mixtures of photosensitizers and activators hereinafter defined are used and that the photosensitizer alone or the activator alone at the same total concentration of the two together does not show the same rate; that is, the mixtures at a specified total concentration show a faster rate of reaction that either component at the same total concentration of the two. It has further been found that the increased rate of reaction does not result in any appreciable apparent detrimental effects of the physical properties of the final product.

The organic carbonyl compounds that are used in this invention as photosensitizers can be represented by the general formulas shown below. These compounds include the alkylphenone type shown by Formula I, the benzophenone type shown by Formula II, and the tricyclic fused ring type shown by Formula III:

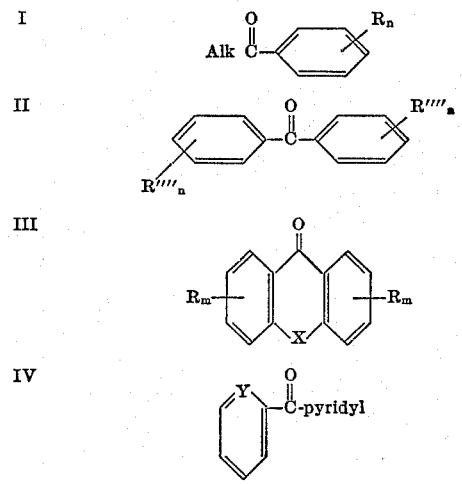

wherein R is hydrogen, alkyl having from 1 to about 12 carbon atoms (methyl, ethyl, propyl, isopropyl, butyl, isobutyl, t-butyl, hexyl, neohexyl, octyl, 2-ethylhexyl, decyl, dodecyl, etc.), alkenyl having from 2 to about 8 carbon atoms (ethenyl, propenyl, isopropenyl, butenyl, hexenyl, octenyl, etc.), aralkyl or alkaryl having from 7 to about 15 carbon atoms (tolyl, benzyl, xylyl, cumenyl, mesityl, phenethyl, ethylphenyl, methylnaphthyl, naphthal, ethylnaphthyl, dipropylnaphthyl, etc.), alkoxy having from 1 to about 10 carbon atoms (methoxy, ethoxy, propoxy, isopropoxy, butoxy, pentoxy, 2-ethylhexoxy, decoxy, etc.), alkanoyl having from 2 to about 12 carbon atoms (acetyl, propionyl, isopropionyl, butyryl, pentanoyl, octanoyl, dodecanoyl, etc.) and halogen (chloro, bromo, iodo); Alk is alkyl having from 1 to about 3 carbon atoms; R'''' has the same meanings as R and in addition can be an $$-N\begin{matrix}\diagup Alk \\ \diagdown Alk\end{matrix}$$

group; X can be nothing, a

—C—
‖
O group, —S— or —O—; Y is a carbon or nitrogen; m has a value of 0 to 4; n has a value of 0 to 2. In the compounds of Formulas I and II and R and R'''' are in the meta or para positions.

In Formula III, when the 9 position is substituted with a keto oxygen then the R substituent in the 1 or 8 position can be hydrogen or halogen only; the same holds for the R substituent in the 4 or 5 position when the 10 position is substituted with a keto oxygen.

Subgeneric to compounds of Formula III are the following:

IIIA 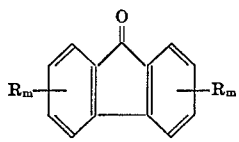

IIIB 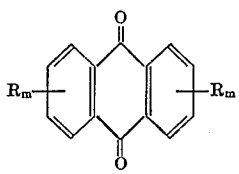

IIIC 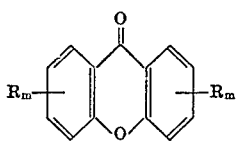

IIID 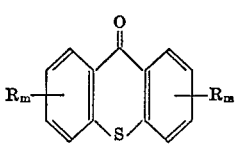

Illustrative of suitable organic carbonyl compounds one can mention acetophenone,
propiophenone,
butyrophenone,
3-methylacetophenone,
4-vinylacetophenone,
4-(2-ethylhexyl)-acetophenone,
3-allylacetophenone,
4-vinylacetophenone,
4-hexylpropionphenone,
3-butenylbutyrophenone,
4-tolylacetophenone,
3-benzylacetopehnone,
3-xylylacetophenone,
3-methoxyacetophenone,
3-methoxybutyrophenone,
3-decoxyacetophenone,
4-heptoxypropiophenone,
3-bromoacetophenone,
4-chloroacetophenone,
3-chloropropiophenone,
4-iodoacetophenone,
1,4-diacetylbenzene,
1,3-diacetylbenzene,
1,3,4-triacetylbenzene,
1,4-dipropionylbenzene,
1,4-dibutyrobenzene,
3,4-dimethylacetophenone,
1-chloroacetophenone,
1-bromoacetophenone,
1,1'-dichlorobenzophenone,
1-chloroanthraquinone,
1-bromoanthraquinone,
1-chloroxanthane,
1-chlorothioxanthone,
2-chlorothioxanthane,
2,2'-dipyridylketone,
2-benzolypridine,
3-benzoylpyridine
4-benzoylpyridine,
3,4-dihexylacetophenone,
3,4-diethylpropiophenone,
3-methyl-4-methoxyacetophenone,
benzophenone,
4,4'-dimethylbenzophenone,
3,4'-dimethylbenzophenone,
3,3'-diethylbenzophenone,
4,4'-dioctylbenzophenone,
3,4,4'-trimethylbenzophenone,
4,4'-diallylbenzophenone,
4,4'-divinylbenzophenone,
3,3'-ditolylbenzophenone,
4,4'-dimethoxybenzophenone,
4,4'-diisopropoxybenzophenone,
4,4'-diacetylbenzophenone,
3,4'-dipropiobenzophenone,
3-methylbenzophenone,
4-ethylbenzophenone,
4-octylbenzophenone,
4-allylbenzophenone,
3-tolylbenzophenone,
4-benzylbenzophenone,
3-methoxybenzophenone,
4-pentoxybenzophenone,
4,4'-dimethoxybenzophenone,
4,4'-bis(dimethylamino)benzophenone,
3-chlorobenzophenone,
4-iodobenzophenone,
3,4'-dichlorobenzophenone,
4-chloro-4'-benzylbenzophenone,
4-methyl-4'-chlorobenzophenone;
fluorenone,
2-methylfluorenone,
1-propylfluorenone,
2,7-dimethylfluorenone,
2-vinylfluorenone,
2-benzylfluorenone,
2-ethoxyfluorenone,
2,6-dimethoxyfluorenone,
2,4,5-trimethylfluorenone,
2-acetylfluorenone,
2-chlorofluorenone,
2,7-dichlorofluorenone;
anthraquinone,
2-methylanthraquinone,
2,6-dimethylanthraquinone,
1,5-diethylanthraquinone,
2-vinylanthraquinone,
2-xylylanthraquinone,
2,6-dimethoxyanthraquinone,
2,7-diethoxyanthraquinone,
2-acetylanthraquinone,
2-chloroanthraquinone,
2,4,8-trichloranthraquinone,
2-bromoanthraquinone;
xanthone,
2-methylxanthone,
3-pentylxanthone,
2,6-diethylxanthone,
2-tolyxanthone,
2-methoxyxanthone
4-methoxyxanthone,
2-acetylxanthone,
2,7-diacetylxanthone,
3-chloroxanthone,
4-bromoxanthone,
2-chloroxanthone,
2,7-dichloroxanthone,
2-chloro-6-nonylxanthone,
2-iodo-5-methoxyxanthone,
thioxanthone,
2-methylthioxanthone; and the like.

organic amines can be aliphatic amines and aromatic amines having at least one N-alkyl group, heterocyclic amines, or combinations thereof. They can be substituted or unsubstituted, wherein the substituents can be, for example, halogen atoms, hydroxyl groups or alkoxy groups. taken together R'' and R'' can be a divalent alkylene The preferred photosensitizers are benzophenone, xanthone, thioxanthone, and their derivatives, and 4,4'-bis-(dimethylamino)diphenyl ketone.

The organic amines that are suitable in this invention as activators can have one or more amino groups in the molecule; they can be primary, secondary or tertiary amino groups. The preferred organic amines are the tertiary amines with the alkanol amines most preferred. The organic amines can be aliphatic amines aromatic amines having at least one N-alkyl group, heterocyclic amines, or combinations thereof. They can be substituted or unsubstituted, wherein the substituents can be, for example, halogen atoms, hydroxyl groups or alkoxy groups.

The amines can be represented by the general formula:

$$R''-\underset{\underset{R'}{|}}{N}-R'''$$

wherein R' and R" taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, arkaryl having from 6 to about 12 ring carbon atoms, aralkyl having from 6 to about 12 ring carbon atoms; R''' has the same meaning as R' and R" with the exceptions that it cannot be hydrogen and that it cannot be aryl when both R' and R" are aryl. When taken together R" and R''' can be a divalent alkylene group $(-C_nH_{2n}-)$ having from 2 to about 12 carbon atoms, a divalent alkenylene group $+C_nH_{2n-1}+$ group having from 3 to about 10 carbon atoms, a divalent alkadienylene group $+C_nH_{2n-2}+$ group having from 5 to about 10 carbon atoms, a divalent alkatrienylene group $+C_nH_{2n-3}+$ having from 5 to about 10 carbon atoms, a divalent alkyleneoxyalkylene group $+C_xH_{2x}OC_xH_{2x}+$ having a total of from 4 to about 12 carbon atoms, or a divalent alkyleneaminoalkylene group $$\left(-C_xH_{2x}\underset{\underset{R'}{|}}{N}C_xH_{2x}-\right)$$

having a total of from 4 to about 12 carbon atoms. As previously indicated, the amines can be substituted with other groups; thus, the R', R" and R''' variables, whether taken singly or together, can contain one or more substituents thereon. The nature of such substituents is generally not of significant importance and any substituent group can be present that does not exert a pronounced deterrent effect on the crosslinking reaction.

Illustrative of suitable organic amines one can mention methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, didecylamine, tridodecylamine, tri-2-chloroethylamine, di-2-bromoethylamine, methanolamine, ethanolamine, diethanolamine, triethanolamine, methyldiethanolamine, dimethylethanolamine, methyldiethanolimine, isopropanolamine, propanolamine, diisopropanolamine, triisopropanolamine, butylethanolamine, dihexanolamine, 2 - methoxyethylamine, di-2-ethoxyethylamine, tri-2-ethoxyethylamine, 2 - hydroxyethyldiisopropylamine, 2-aminoethylethanolamine, allylamine, butenylamine, dihexadientylamine, cyclohexylamine, tricyclohexylamine, trimethylcyclohexylamine, bis - methylcyclopentylamine, tricyclohexenylamine, tricyclohexadienylamine, tricyclopentadienylamine, N - methyl - N - cyclohexylamine, N-2-ethylhexyl-N-cyclohexylamine, diphenylamine, phenyldimethylamine, methylphenylamine, ditolylamine, trixylylamine, tribenzylamine, triphenethylamine, benzyldimethylamine, benzyldihexylamine, tris-chlorophenethylenimine, N - methylethylenimine, N - cyclohexylethylenimine, piperidine, N-ethylpiperidine, 2-methylpiperidine, 1,2,3,4-tetrahydropyridine, 1,2-dihydropyridine, 2-, 3- and 4-picoline, morpholine, N-methylmorpholine, N-2-hydroxyethylmorpholine, N-2-ethoxyethylmorpholine, piperazine, N - methylpiperazine, N,N' - dimethylpiperazine, 2,2 - dimethyl - 1,3 - bis[3-(N-morpholinyl)-propionyloxy]propane, 1,5 - bis[3 - (N-morpholinyl)-propionyloxy]diethyl ether, and the like. The preferred amine activators are triethanolamine, morpholine and methyldiethanolamine.

The compositions reacted by the processes of this invention contain from about 0.1 to about 10 weight percent or more of each of the organic carbonyl photosensitizer and the organic amine activator, the preferred amount of each is from about 0.1 to about 5 weight percent with a most preferred concentration of each being from about 1 to about 3 weight percent. The ratio of the equivalent concentration of ketonic oxygen atoms in the organic carbonyl photosensitizer to the equivalent concentration of the amine nitrogen atoms in the organic amine activator can vary from about 0.1:1 or lower to about 10:1 or higher; the preferred ratio is from about 0.25:1 to about 1.5:1. The compositions containing the mixture of one or more photosensitizers plus one or more activators are then reacted by exposure to the light energy source.

DESCRIPTION OF THE INVENTION

The monomers that can be polymerized by the process of this invention are the polymerizable ethylenically unsaturated monomers containing at least one polymerizable ethylenically unsaturated group of the structure $$\diagdown_{C=C}\diagup$$

The process can be used to polymerize a single monomer or a mixture of two or more monomers throughout the entire concentration ranges possible, selected solely to suit the scientist's purpose. The monomers can be aliphatic, aromatic, cycloaliphatic, or any variant thereof. Illustrative thereof one can mention the olefinic hydrocarbons containing up to about 18 carbon atoms such as ethylene, propylene, butylenes, pentenes, hexenes, dodecene, heptenes, octenes, styrene, 4-methylstyrene, alpha-methylstyrene, cyclopentadiene, dicyclopentadiene, butadiene, hexadiene, bicyclo[2.2.1]hept-2-ene, bicyclo[2.2.1]hept-2,5-diene, methylbicyclo[2.2.1]hept-2-ene, cyclohexene, 4-methyl-1-pentene, 5-methyl-1-hexene, and the like; acrylic acid and its derivatives, such as acrylonitrile, methacrylonitrile, acrylamide, methacrylamide, methacrylic acid, methyl methacrylate, ethyl methacrylate, ethyl acrylate, 2-ethylhexyl acrylate, butoxyethoxyethyl acrylate, neopentyl glycol diacrylate as well as others hereinafter discussed, and the like; the vinyl halides such as vinyl chloride, vinylidene chloride, and the like; the vinyl esters such as vinyl acetate, vinyl butyrate, vinyl benzoate, and the like; the vinyl ketones such as isopropenyl methyl ketone, vinyl phenyl ketone, vinyl methyl ketone, alpha-chlorovinyl methyl ketone, and the like; the vinyl thioethers such as vinyl ethyl sulfide, vinyl p-tolyl sulfide, divinyl sulfide, and the like. Other monomers or monomer mixtures which are capable of polymerization by the process of this invention are divinyl sulfone, vinyl ethyl sulfone, vinyl ethyl sulfoxide, vinyl sulfonic acid, sodium vinyl sulfonate, vinyl sulfonamide, vinyl pyridine, N-vinyl pyrollidone, N-vinyl carbazole, and the like. Other suitable vinyl monomers are readily apparent to the skilled polymer chemist; this listing is illustrative only and not all-inclusive. The preferred monomers include styrene and its derivatives and the acrylyl and methacrylyl compounds and derivatives thereof. Oligomers can also be used; oligomers, as is well known, are low molecular weight polymerizates.

Of particular interest are the 100 percent solids coating compositions consisting of a curable or crosslinkable polymer or oligomer and a reactive monomer such as an acrylyl ester as the polymerizable ethylenically unsaturated monomer. Such compositions have recently become commercially significant. The acrylyl esters that are useful in producing coating compositions that are useful in this invention are the mono- and polyacrylyl compounds represented by the general formulas:

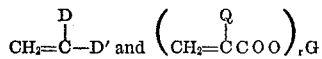

wherein D is hydrogen, methyl or chlorine; D is cyano, —CONH$_2$, substituted or unsubstituted aryl of from 6 to about 12 carbon atoms (e.g phenyl, xylyl, tolyl, naphthyl, naphthal, benzyl, etc.), or —COOD''; D'' is hydrogen, cycloalkyl of 5 to 12 carbon atoms (e.g. cyclopentyl, dicyclopentyl, methylcyclopentyl, dimethylcyclopentyl, etc.), cycloalkenyl of 5 to 12 carbon atoms (e.g. cyclopentenyl, methylcyclopentenyl, dicyclopentenyl, bicyclo[2.2.1]hept-2-en-5-yl, bicyclo[2.2.1]hept-2-en - 5 - ylmethyl, bicyclo [2.2.1]hept-2-en-5-ylpropyl, etc.), —C$_p$H$_{2p}$D''' or $$\text{+}(C_rH_{2r}O)_sC_rH_{2r+1};$$

$p$ is an integer of 1 to 10; $r$ is an integer of 2 to 4; $s$ is an integer of 0 to 4; D''' is hydrogen, hydroxyl, phenoxyl, alkoxy of from 1 to 8 carbon atoms, methylcarbamoyl, cynao, chlorine or —ND$_2$''''; D'''' is hydrogen or alkyl of 1 to 5 carbon atoms; Q is hydrogen or methyl; G is a polyvalent alkylene group of the formula $$—C_xH_{2x-y}—$$

in which $x$ is 2 to 8 and $y$ is 0 to 2 (e.g. (a) divalent alkylene =C$_x$H$_{2x}$ when $y$=0, i.e. —C$_2$H$_4$—, —C$_2$H$_6$—, iso —C$_3$H$_6$—, C$_5$H$_{10}$—, neo —C$_6$H$_{12}$—, etc.; (b) trivalent alkylene ≡C$_x$H$_{2x-1}$ when $y$=1, i.e.

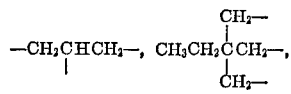

etc.; or (c) tetravalent alkylene ≡C$_x$H$_{2x-2}$ when $y$ is 2, i.e.

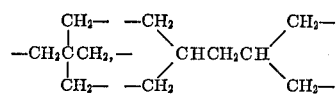

etc.), a divalent +(C$_r$H$_{2r}$O)$_t$C$_r$H$_{2r}$— group or a divalent +(C$_r$H$_{2r}$COO)$_t$C$_r$H$_{2r}$— group in which $t$ is to 1 to 5 (e.g. oxyethylene, oxypropylene, oxybutylene, polyoxyethylene, polyoxypropylene, polyoxybutylene, polyoxyethylene-oxypropylene,

—CH$_2$C(CH$_3$)$_2$COOCH$_2$C(CH$_3$)$_2$CH$_2$— etc.); and $r$ is the valence of G and can be from 2 to 4.

The acrylyl compounds defined by the general formulas above are well known in the art and many of them are described in "Vinyl and Related Polymers" by C. E. Schildknecht, published in 1952 by John Wiley and Sons. The common knowledge of these compounds makes the specific naming thereof in this application unnecessary in view of the extensive description set forth above.

The 100 percent solids coating compositions are produced by mixing the selected components thereof by conventional known methods. The blend can be heated, if desired, to facilitate mixing.

The compositions can be applied to the material to be treated by conventional means, including spray, curtain, dip pad and roll-coating techniques, and may, if desired, be dried under ambient or oven conditions to provide coating films on the substrate. The substrate can be any composition, e.g. wood, metal, paper, plastic, fabric, fiber, ceramic concrete, plaster, glass, etc.

In a typical method for carrying out the process of this invention a mixture of the monomer to be polymerized, or the oligomer composition, the organic carbonyl photosensitizer and the organic amine activator is prepared and the mixture is then exposed to light radiation having wavelengths above 2,000 angstrom units, preferably from about 2,000 angstrom units to about 5,000 angstrom units.

The light radiation can be ultraviolet light generated from the known low, medium and high pressure mercury lamps. This equipment is readily available and its use is well known to those skilled in the art of radiation chemistry. The largest such mercury lamp of commercial utility is generally about five feet long having a diameter of about one to two inches with an electrical input of about 20 kilowatts generating a typical low intensity ultraviolet light line structure (source intensity is generally no greater than about 20 kilowatts per square foot of source projected area). A long period of time is generally needed for completion of a reaction when a material is exposed to the low intensity ultraviolet radiation generated from a mercury lamp.

It has recently been discovered that a source of light radiation emitting high intensity predominantly continuum light radiation containing ultraviolet, visible and infrared radiation can be used to polymerize monomers and to crosslink polymer compositions. By means of proper light filters, one can selectively screen out a portion of the light radiation emitted, permitting only that wavelength portion desired to reach the material that is being treated.

The term "high intensity predominantly continuum light radiation" means continuum radiation with a source intensity or radiance of at least 350 watts per square centimeter steradian (about 1,000 kilowatts per square foot of source projected area) having only a minor part of the energy in peaks of bandwidths less than 100 angstrom units, with less than about 30 percent of the light radiated having wavelengths shorter than 4,000 angstrom units and at least about 70 percent of the light energy radiated having wavelengths longer than 4,000 angstrom units.

This light radiation is derived from an artificial source that generates non-ionizing high intensity predominantly continuum light radiation with a source intensity or radiance of at least about 350 watts per square centimeter steradian when integrated throughout the entire spectral range of said continuum light radiation, as abbreviated by the term: watts cm.$^{-2}$sr.$^{-1}$; said high intensity predominantly continuum artificial light radiation has at least about 70 percent of the light radiated at a wavelength longer than 4,000 angstroms and a positive amount up to about 30 percent of the light radiated having a wavelength shorter than 4,000 angstroms, generally about 80 percent of the light radiated has a wavelength longer than 4,000 angstroms and a positive amount less than about 20 percent of light radiated has a wavelength shorter than 4,000 angstroms, and a source intensity or radiance that can vary from about 350 watts (about 1,000 kilowatts per square foot of source projected area) to about 5,000 watts (about 15,000 kilowatts per square foot of source projected area) or more per square centimeter steradian. A convenient source of non-ionizing high intensity predominantly continuum light radiation is a swirl-flow plasma arc light radiation apparatus. The equipment for generating high intensity predominantly continuum light radiation by this means is known and available; many different forms thereof are described in the literature. A highly efficient apparatus for obtaining high intensity predominantly continuum light radiation is the swirl-flow plasma arc radiation source described in U.S. 3,364,387. The apparatus or equipment necessary for generating the light radiation is not the subject of this invention and any source or apparatus capable of generating high intensity predominantly continuum light radiation can be used.

While any artificial source of generating high intensity predominantly continuum light radiation can be used, as previously indicated the swirl-flow plasma arc radiation apparatus is most convenient. Hence, this source will be used in this application as illustrative of a means for obtaining the high intensity predominantly continuum light radiation. Any apparatus that operates according to the known principles of the swirl-flow plasma arc radiation source can be used to produce the high intensity predominantly continuum light radiation useful in the processes of this invention. These apparatuses are often known by other terms but those skilled in this art recognize that they emit high intensity predominantly continuum light radiation. The source of radiation in a 50 kilowatt swirl-flow plasma arc radiation source is an arc only about four inches long enclosed in a quartz envelope about 1.5 inches in diameter. This lamp can be readily removed and refurbished and has an acceptable long lifetime. Further, a swirl-flow plasma arc radiation apparatus having a 250-kilowatt rating would be only about two or three times as large as a 50-kilowatt source. Another advantage is the absence of a need for expensive radiation shielding. Precautions required for the artificial light sources include those needed to protect one's eyes from the intense visible light and from the ultraviolet light present to prevent inadvertent sunburn effect on the body.

It is to be noted that in the spectra of high intensity predominantly continuum light radiation there is a continuum of radiation throughout the entire spectral range. This type of continuum radiation in the ultraviolet range has not heretofore been obtainable from the conventional commercial mercury arcs or lamps generally available for generating ultraviolet light. The previously known means for generating ultraviolet light produced light that shows a line or peak spectrum in the ultraviolet range, it is not a continuum spectrum in the ultraviolet range. In a line spectrum the major portion of useable ultraviolet light is that portion at which the line or band in the spectrum forms a peak; in order for such energy to be useful the material or composition that is to be treated with ultraviolet radiation must be capable of absorbing at that particular wavelength range at which the peak appears. In the event the material or composition does not have the ability to absorb at that particular wavelength range there is little or no absorption or reaction. Thus, in the event the material or composition to be treated absorbs at a particular wavelength range in one of the valleys of the spectral curve there will be little or no reaction since there is little or no ultraviolet energy to adequately excite the system. With a high intensity predominantly continuum radiation there is a high intensity continuum radiation of ultraviolet energy across the entire ultraviolet wavelength range of the spectrum and there is generally sufficient ultraviolet energy generated at all useful ultraviolet wavelengths to enable one to carry out reactions responsive to ultraviolet radiation without the problem of selecting compounds that will absorb at the peak wavelength bands only. With the high intensity continuum radiation now discovered one does not have the problem of being unable to react materials or compositions that absorb in the valley areas only since for all intents and purposes such valleys do not exist in high intensity continuum radiation, the high intensity radiated light energy is essentially a continuum, it is not in peak bands.

High intensity predominantly continuum light radiation is to be distinguished from low intensity ultraviolet radiation generated by commercally available low, medium and high pressure mercury arc ultraviolet lamps. These mercury arc lamps produce light emission which is primarily line or peak rather than continuum light, wherein a major part of the light appears in bands narrower than 100 angstrom units and much less than 70 percent is above 4,000 angstrom units.

As is known, high intensity predominantly continuum light radiation from a swirl-flow plasma arc radiation source is emitted from an arc generated between a pair of electrodes that are lined up axially and encased in a quartz cylinder. In an embodiment a pair of concentric quartz cylinders between which cooling water or gas flows is used. A rare gas, such as argon, krypton, neon or xenon, introduced into the inner cylinder tangentially through inlets located at one end of the inner cylinder, creates a swirling flow or vortex which restricts the arc to a small diameter. An electrical potential applied across the electrodes causes a high density current to flow through the gas to generate a plasma composed of electrons, positively charged ions and neutral atoms. A plasma generated in the above gases produces high intensity predominantly continuum light radiation with diffuse maxima in the region of from about 3,500 to about 6,000 angstroms. The radiation source can also be used with reflectors or refractive optical systems to direct the high intensity predominantly continuum light radiation emanating from the arc to a particular point or direction or geometrical area.

It has been found that the high intensity predominantly continuum light radiation from, for example, a swirl-flow plasma arc radiation source causes many monomers and oligomers to polymerize quite rapidly with the mixtures of activators and photosensitizers of this invention. The same effect was observed in the curing or cross-linking of polymer compositions containing from 5 to 50 weight percent, preferably 15 to 30 weight percent of one or more acrylyl compounds therein. By comparison, low intensity ultraviolet line radiation from mercury lamps was slower but still effective with such mixtures. Generally, high intensity predominantly continuum light radiation was effective within seconds, or at the most several minutes. Whereas, low intensity ultraviolet light radiation required appreciably longer periods of time to achieve the same effect.

Among the polymer compositions that can be cured by this invention when admixed with from 5 to 50 weight percent, preferably 15 to 30 weight percent, of a polymerizable monomer or acrylyl compound, one can mention the polyolefins and modified polyolefins, the vinyl polymers, the polyethers, the polyesters, the polyactones, the polyamides, the polyurethanes, the polyamides, the polyureas, the polysiloxanes, the polysulfides, the polysulfones, the polyformaldehydes, the phenol-formaldehyde polymers, the natural and modified natural polymers, the heterocyclic polymers, and the like.

Illustrative thereof one can mention the acrylic polymers as poly(acrylic acid), poly(methyl acrylate), poly (ethyl acrylate), poly(methacrylic acid), poly(methyl methacrylate), poly(ethyl methacrylate); poly(vinyl chloride); poly(ethylene/propylene/5-ethylidenebicyclo [2.2.1]hept-2-ene; the polyesters and polyamides such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutardialdehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymer using ethylene glycol, glycerol, sucrose, etc., as the starter; the known polyureas and polyurethanes as described in "Polyurethanes: Chemistry and Technology," volumes I and II, Sanders and Frisch, published by Interscience Publishers, as well as the natural and modified natural polymers such as gutta percha, cellulose, methyl cellulose, starch, silk, wool, and the like; the siloxane polymers and copolymers; the formaldehyde polymers such as polyformaldehyde, formaldehyde resins such as phenolformaldehyde, melamine-formaldehyde, urea-formaldehyde, aniline-formaldehyde and acetone-formaldehyde, and the like.

The rapid rate at which the compositons cure or polymerize when using the mixture of photosensitizers and activators herein disclosed was completely unexpected and unobvious. Further, in some instances the use of only one of the components would not result in cross-linking or polymerization. This is evident from the results in Example 1, Table II. In that example, the presence of two weight percent of benzophenone alone failed to achieve curing of the polyester when it was exposed to the mercury arc; this data is identified as "Control, none" in Table II. It is also evident from the results of Example 7, in which the controls required from 2.5 to 5 times the time required as compared to the compositions containing the mixtures of photosensitizers and activators. Examples 9 and 10 clearly show the unexpected and unobvious results achieved in the polymerization of monomers. It is further to be noted that these higher rates are achieved without any deleterious effect on the final product; in fact in many instances the end product had better properties.

In the following examples, which serve to illustrate this invention, the following test procedures were used.

Sward hardness—Paint Testing Manual issued by Gardner Laboratory, Inc., P.O. Box 5728, Bethesda 14, Md., p. 138.
Reverse impact test—Same as above, p. 146.
Crosshatch adhesion—Conducted by scribing a film with a sharp knife into ten ⅛″ squares, pressing scotch tape firmly against the scribed surface at a 45° angle to the squares and puling the tape away with one quick motion. Based on film condition the adhesion is rated: E (no effect—excellent), G (good—slight effect), F (fair—most of the film remains on the substrate) and P (poor—tape removes essentially all of the coating from the substrate).

Example 1

A mixture of 4,100 grams of bicyclo[2.2.1]hept-5-en-2,3-dicarboxylic acid anhydride, 5,400 grams of 2,2-dimethyl - 3 - hydroxypropyl-2,3-dimethyl - 3 - hydroxypropionate and 240 grams of pentaerythritol was polymerized by heating at 200° C. The polyester that was produced had an acid number of 10.4 and a reduced viscosity of 0.072 at 30° C. using a 0.2 percent benzene solution.

The polyester was used to produce a 100 percent solids coating composition by mixing 70 parts of the liquid polyester with 22.5 parts of 2-ethylhexyl acrylate and 7.5 parts of neopentylglycol diacrylate, by weight. To portions of this coating composition there were added two weight percent of benzophenone plus two weight percent of the various organic amines listed in Tables I and II. The reactive coating compositions were coated on a substrate to produce 0.5 mil thick films and the wet films were exposed to light radiation from a 550-watt mercury arc at a distance of one foot from the mercury arc and to the high intensity predominantly continuum light radiation from a 50-kilowatt argon swirl-flow plasma arc radiation source at a distance of two feet from the plasma arc. In the tables that follow the exposure times necessary to obtain a tack-free film with the compositions containing the different combinations of the organic carbonyl compound and the organic amines are reported.

TABLE 1

| Organic amine: | Exposure time to Plasma arc, sec. |
|---|---|
| Control, none | 30 |
| Triethanolamine | 10 |
| Methyldiethanolamine | 10 |
| MNPGD (8 wt. percent used) | 10 |
| MDEGD (8 wt. percent used) | 10 |
| Triethylamine | 15 |
| Dibutylamine | 15 |
| N-methylmorpholine | 15 |
| Butylamine | 20 |

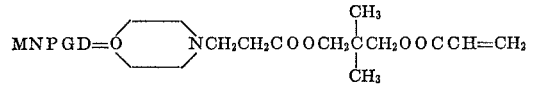

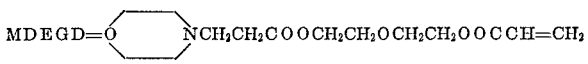

TABLE II

| Organic amine: | Exposure time to Mercury arc, sec. |
|---|---|
| Control, none | Not cured after 600 sec. |
| Triethanolamine | 220 |
| Methyldiethanolamine | 180 |
| MNPGD (8 wt. percent used) | 130 |
| MDEGD (8 wt. percent used) | 460 |
| Triethylamine | 280 |
| Dibutylamine | 320 |
| N-methylmorpholine | 250 |
| Butylamine | 600 |
| N,N-dimethylbenzylamine | 490 |
| N,N-dimethylaniline | 530 |

As shown by the results obtained in Tables I and II, the use of the combination of a mixture of benzophenone with an organic amine in all instances required a shorter exposure time to yield a tack-free coating. Further, in the absence of the amine activator ultraviolet light from a mercury arc was not effective.

Example 2

To the same coating composition described in Example 1 there were added two weight percent of benzophenone plus two weight percent of the various organic amines shown in Tables III and IV. These reactive coating compositions were coated on steel panels and the wet films were cured by the two methods shown in Example 1. In the first method the films were exposed to the high intensity predominantly continuum light radiation from a 50-kilowatt argon swirl-flow plasma arc radiation source at a distance of two feet from the arc. In the second method the films were exposed to ultraviolet light radiation from a 550-watt mercury arc at a distance of one foot from the mercury arc. The properties of the cured films were then determined.

TABLE III

Part A.—0.5 mil wet films exposed to plasma arc radiation source for 20 seconds

| Organic amine | Cross hatch adhesion | Reverse impact, in.-lb. | Sward hardness |
|---|---|---|---|
| Diisopropylamine | Excellent | >165 | 56 |
| Diisopropanolamine | do | >165 | 36 |
| Diisopropylethanolamine | do | >165 | 40 |
| Methyldiethanolamine | do | >165 | 38 |
| Diethanolamine | do | >165 | 38 |
| Aminoethyl ethanolamine | do | >165 | 34 |
| Dibutylamine | do | >165 | 36 |
| Triisopropanolamine | do | >165 | 32 |

Part B.—Four mils wet films exposed to plasma arc radiation source for 30 seconds

| Diisopropylamine | Excellent | 45 | 20 |
|---|---|---|---|
| Diisopropanolamine | Poor | 30 | 10 |
| Diisopropyl ethanolamine | Excellent | 150 | 10 |
| Methyl diethanolamine | do | 90 | 16 |
| Diethanolamine | Poor | >165 | 10 |
| Aminoethyl ethanolamine | Excellent | 100 | 18 |
| Dibutylamine | do | 85 | 22 |
| Triisopropanolamine | do | >165 | 10 |

In all instances, the cured coatings of Table III were smooth and glossy after exposure to the plasma arc radiation source.

TABLE IV

Part A.—0.5 mil wet films exposed to mercury arc for five minutes (300 seconds)

| Organic amine | Reverse impact, in.-lb. | Sward hardness |
|---|---|---|
| Triisopropanolamine | >165 | 24 |
| Aminoethyl ethanolamine | >165 | 8 |
| Diethanolamine | >165 | 8 |
| Methyldiethanolamine | >165 | 15 |
| Diisopropylamine | >165 | 8 |
| Diisopropyl ethanolamine | >165 | 8 |
| Dibutylamine | >165 | 10 |

Part B.—One mil wet films exposed to mercury arc for seven minute (420 seconds)

| | | |
|---|---|---|
| Control, none | >165 | 4 |
| Triethanolamine | 35 | 16 |
| Triethylamine | 145 | 22 |
| N-2-ethylhexylcyclohexylamine | 5 | 16 |
| Dibutylamine | 95 | 10 |
| Butylamine | 150 | 4 |
| N-methymorpholine | >165 | 20 |
| Methyldiethanolamine | 55 | 18 |
| MNPGD (8 wt. percent used) | 75 | 14 |
| MDEGD (8 wt. percent used) | 165 | 16 |
| N,N-dimethylbenzylamine | 150 | 10 |

In all instances in which the mixtures of benzophenone and organic amines were used the cured coatings were smooth and glossy. The control of Part B of Table IV cured to a tacky film only.

Example 3

The same 100 percent solids coating composition described in Example 1 was mixed with two weight percent of methyldiethanolamine plus two weight percent of various organic carbonyl compounds. These coating compositions were applied to steel panels at a wet film thickness of 0.5 mil and the coatings were exposed to high intensity predominantly continuum light radiation from a 50-kilowatt argon swirlflow plasma arc radiation source at a distance of two feet from the plasma arc, in air. The following table describes the properties of the resulting cured films and the exposure times required to obtain these properties.

TABLE V

| Organic compound | Exposure time, sec. | Reverse impact, in.-lb. | Sward hardness |
|---|---|---|---|
| Benzophenone | 10 | >165 | 20 |
| Anthraquinone | 15 | >165 | 8 |
| Fluorenone | 20 | >165 | 32 |
| p-Methoxybenzophenone | 10 | >165 | 22 |
| p-Bromobenzophenone | 10 | >165 | 12 |
| p-Diacetylbenzene | 10 | >165 | 20 |
| Triactylbenzene | 15 | >165 | 20 |
| Xanthone | 10 | >165 | 18 |
| 3-chloroxanthone | 10 | >165 | 18 |

Example 4

A 100 percent solids coating composition was prepared by dissolving 30 grams of poly(methyl methacrylate), which had a reduced viscosity of 0.38 using a 0.5 weight percent benzene solution, with 52.5 grams of 2-butoxyethyl acrylate, 12.5 grams of neopentyl glycol diacrylate and 5 grams of 5-norbornen-2-ylmethyl 5-norbornene-2-carboxylate. To the coating composition there was added 3 weight percent benzophenone and 2 weight percent triethanolamine. The coating was applied to steel sheets with a wire-wound rod so as to apply a wet film of 0.5 mil thickness. The coated panels were exposed to the high intensity predominantly continuum light radiation from a 50-kilowatt argon swirl-flow plasma arc at a distance of two feet from the arc for a period of five seconds. The cured coating was smooth with some pitting evident; it had a reverse impact greater than 165 in.-lb. and a Sward hardness of 26.

Example 5

A solution of 100 grams of poly-epsilon-caprolactone triol having an average molecular weight of about 800 (produced by the reaction of epsilon-caprolactone with the adduct of glycerol and 3 moles of ethylene oxide) 200 ml. of benzene and 2 drops of dibutyltin dilaurate, was prepared in a one-liter resin kettle equipped wtih stirrer, reflux condenser, dropping funnel and thermocouple inlet. With stirring and under a slight positive pressure of nitrogen, 88.03 grams of bis(2-isocyanatoethyl) 5-norbornene-2,3-dicarboxylate were added over a period of twenty minutes while maintaining a temperature of the reaction mixture at about 20° C. by means of an external ice bath. The mixture was stirred for 4.5 hours at 20° C., 32.3 grams of n-butanol were added, and the reaction mixture was stirred overnight (16 hours). The following day the temperature was raised to 100° C. and the low boiling components were removed in vacuo. The resin was purged with nitrogen and dumped from the reactor yielding 199.5 g. of viscous, sticky urethane polymer having a reduced viscosity in benzene (0.5% solution at 30° C.) of 0.086, while in N,N-dimethylformamide (0.5% solution at 30° C.) it was 0.188.

Thirty-five grams of the urethane resin described above was mixed with 15 grams of neopentyl glycol diacrylate, 2.5 weight percent of benzophenone and one weight percent of triethanolamine. The material was applied as a 1-mil wet film to a steel panel and the coated panel was exposed to the high intensity predominantly continuum light radiation from a 50-kilowatt argon swirl-flow plasma arc for 20 seconds at a distance of two feet from the arc. The cured coating showed a reverse impact greater than 165 in.-lb., a Sward hardness of 14 and excellent cross-hatch adhesion and steam resistance.

Example 6

A silicon-modified polyester resin was prepared by reacting 143.9 grams of neopentyl glycol, 84.7 grams of maleic anhydride, 60 grams of xylene, and 214.9 grams of methoxy-capped linear phenyl- and methyl-substiuted siloxane having an average molecular weight of 450. The siloxane polymer used as the starting material was the reaction product of equimolar amounts of dimethyldichlorosilane, diphenyldichlorosilane and water, capped with methanol. The mixture was heated under reflux in a one-liter resin kettle equipped with stirrer, six-inch distillation column, dropping funnel and thermocouple; a total of 30 ml. of methonal and then 24 ml. of water was removed over a period of 12 hours. During that time the kettle temperature was raised to a maximum reflux temperature of 190±5° C. After removal of the water, the still column was replaced with an acetone/Dry Ice condenser, and 114.2 grams of dicyclopentadiene were added dropwise over a period of three hours at a kettle temperature of 190° C. At the completion of the addition of the dicyclopentadiene the temperature was lowered to 150±10° C., and the excess mono- and/or dicyclopentadiene was removed in vacuo with a nitrogen purge. A total of 400.7 grams of the silicon-modified polyester resin remained; it had a reduced viscosity in benzene (0.5% solution at 30° C.) of 0.045. Analysis by infrared and nuclear magnetic resonance spectroscopy indicated that essentially all the double bonds present were of the norbornene type.

Two coating compositions were prepared with this siilcon-modified polyester. The first composition (A) contained 15 grams of the silicon-polyester, 10 grams of 2-ethylhexyl acrylate, 3 weight percent of benzophenone and 2 weight percent of methyldiethanolamine. The second composition (B) contained 15 grams of the silicon-polyester, 8.94 grams of 2-ethylhexyl acrylate, 1.06 grams of neopentyl glycol diacrylate, 3 weight percent of benzophenone and 2 weight percent of methyldiethanolamine. Steel panels were coated with wet films 0.3±1 mil thick and the panels were exposed to the high intensity predominantly continuum light radiation from a 50-kilowatt argon swirl-flow plasma arc at a distance of two feet from the arc. Composition A cured in 15 seconds and composition B cured in 25 seconds. Both coatings had excellent cross-hatch adhesion properties, good boiling water resistance and excellent boiling water adhesion. They also had the following properties:

| Coating composition | A | B |
|---|---|---|
| Exposure time, sec | 15 | 25 |
| Sward hardness | 11 | 12 |
| Impact, in.-lb.: | | |
| Front | >165 | >165 |
| Reverse | 125 | 100 |

Example 7

A solution was prepared in a reaction flask using 12.1 parts of a polycaprolactone polyol, 8.3 parts of 2-hydroxyethyl acrylate and 6.9 parts of 2-ethoxyethyl acrylate. The polycaprolactone polyol was the reaction product of trimethylol propane with epsilon-caprolactone to an average molecular weight of about 530. An 80/20 mixture of 2,4- and 2,6-tolylene diisocyanates, 13.8 parts, was gradually added with agitation and then the solution was heated to 60° C. and stirred at that temperature overnight. The following morning it was further diluted with 2-ethoxyethyl acrylate to give a 100 percent solids coating composition containing 52.6 weight percent of the urethane polymer.

Different quantities of benzophenone and methyldiethanolamine were added to separate portions of the coating composition; each portion contained a total of four weight percent of the sensitizers. For comparative purposes two control compositions were prepared, the first containing four weight percent of benzophenone and the second containing four weight percent of methyldiethanolamine. Steel panels were coated with the coating solutions to a wet film thickness to about 0.6 mil. The wet coatings were exposed to the high intensity predominantly continuum light radiation from a 50-kilowatt argon swirl-flow plasma arc at a distance of two feet from the arc. It was found that neither control composition cured to a dry film after an 8 second exposure. The first control (Coating A) required 20 seconds to cure to a dry film and the second control (Coating B) required 25 seconds to cure to a dry film. Thus the controls required from about 2.5 to 5 times the time required for those coating compositions having the mixtures of photosensitizer and activator; an important commercial consideration since one's production rate would be proportionately greater. In Table VI there are listed the amounts of each additive present in each coating composition, the time required to cure the coating to a dry film and the appearance and hardness properties of the film. The cured films of compositions C to G inclusive all had reverse impact values greater than 165 inch-pounds.

TABLE IV

| Coating | Benzo-phenone, percent | Methyl-diethanol amine, percent | Exposure, sec. | Surface appearance | Sward hardness |
|---|---|---|---|---|---|
| A, control | 4 | | 8 | Tacky | |
|  | 4 | | 20 | Dry | |
| B, control | | 4 | 8 | Tacky | |
|  | | 4 | 25 | Dry | |
| C | 2 | 2 | 5 | Uneven | 8 |
|  | 2 | 2 | 8 | Smooth | |
| D | 3.2 | 0.8 | 8 | Smooth | |
| E | 0.8 | 3.2 | 5 | Uneven | 6 |
|  | 0.8 | 3.2 | 8 | Smooth | 8 |
| F | 2.4 | 1.6 | 5 | Uneven | 10 |
|  | 2.4 | 1.6 | 8 | Smooth | 10 |
| G | 1.6 | 2.4 | 5.5 | Smooth | 6 |
|  | 1.6 | 2.4 | 8 | do | 10 |

The tacky films were not cured; the uneven films were cured but showed minor surface irregularities whereas the smooth films did not.

Example 8

A solution was prepared in a reaction flask with 16.3 parts of the same polycaprolactone polyol used in Example 7, 10.8 parts of 2-hydroxyethyl acrylate and 18.7 parts of 2-butoxyethyl acrylate; then 16.5 parts of an 80/20 mixture of 2,4- and 2,6-tolylene diisocyanates was slowly added to it. After addition was completed, the reaction mixture was heated and stirred at 60° C. overnight. The next morning it was diluted to a coating composition containing 60 weight percent of the urethane polymer, 30 weight percent 2-butoxyethyl acrylate and 10 weight percent diethylene glycol diacrylate. The coating composition was pigmented with 38 weight percent of titanium dioxide.

A series of coating compositions or inks was prepared by blending 10 parts by weight of the pigmented coating compositions with varying parts by weight of organic carbonyl photosensitizer organic amine activators. These compositions were coated on steel panels to provide wet films about 0.6 mil thick. The wet films were exposed in air to high intensity predominantly continuum light radiation from a 50-kilowatt argon swirl-flow plasma arc at a distance of two feet from the arc. All of the wet films cured to dry films in less than 4.4 seconds. This was completely unexpected and surprising, particularly in view of the presence of such a high concentration of pigment; pigmented coatings are known to be difficult to cure by light radiation means. Table VII lists the coating compositions, the times needed to cure the coatings to a dry film and the Sward hardnesses of the cured films. All of the coatings had reverse impact values greater than 165 inch-pounds.

TABLE VII

| Coating | Ketone A | Benzo-phenone | MDEOA | Exposure, sec. | Sward hardness |
|---|---|---|---|---|---|
| A | 0.1 | | 0.1 | 4.4 | |
| B | 0.1 | | 0.2 | 3.0 | |
| C | 0.1 | | 0.3 | 3.0 | 10 |
| D | 0.2 | | 0.1 | 2.7 | 8 |
| E | 0.2 | | 0.4 | 2.3 | 10 |
| F | 0.3 | | 0.2 | 2.8 | 10 |
| G | 0.1 | 0.1 | 0.3 | 2.4 | 8 |

NOTE.—Ketone A=4,4'-bis(dimethylamino)benzophenone; MDEOA=methyldiethanolamine.

Example 9

Acrylate ester monomers were polymerized by exposure to the high intensity predominantly continuum light radiation from a 50-kilowatt argon swirl-flow plasma arc at a distance of two feet from the arc. The same monomers were also polymerized by exposure to ultraviolet light from a 550-watt mercury lamp at a distance of one foot from the lamp. In the absence of any additive the monomers did not produce polymer; when the sole additive present was benzophenone polymerization proceeded slowly; when a mixture of organic carbonyl photosensitizer and organic amine activator was present the polymerization proceeded rapidly. The time required for the monomer to produce a composition that was no longer fluid was recorded in each instance.

*Part I*—Five grams of 2-ethoxyethyl acrylate were blended with 3 weight percent benzophenone and 2 weight percent diethanolamine. The mixture was no longer fluid after exposure to the light radiation from the swirl-flow plasma arc radiation source for three seconds.

*Part II*—Five gram portions of 2-butoxyethyl acrylate were blended with 3 weight percent benzophenone (Coating A) and with 3 weight percent benzophenone plus 2 weight percent methyldiethanolamine (Coating B). In the absence of any additive there was no evidence of polymerization after 10 minutes radiation under the mercury lamp. The unobvious and unexpected improvements in cure rate when using our mixtures of photosensitizer and activator are evident.

| Radiation source | Exposure, sec. |
|---|---|
| Coating: | |
| A....... Mercury arc............... | 200 |
| B............do................... | 60 |
| A....... Swirl-flow plasma arc..... | 60 |
| B............do................... | 25 |

*Part III*—Five grams of 2-ethylhexyl acrylate were blended with 3 weight percent benzophenone and 2 weight percent methyldiethanolamine. The monomer polymerized to a non-fluid mass after a 20-second exposure to the light radiation from the swirl-flow plasma arc radiation source. In the absence of any additive the monomer boiled off and polymer was not produced.

*Part IV*—A five gram portion of neopentyl glycol diacrylate blended with 3 weight percent of benzophenone polymerized to the non-fluid state after exposure to the mercury lamp radiation for 60 seconds. Separate five grams portions of this diacrylate containing a mixture of 3 weight percent benzophenone and 2 weight percent methyldiethanolamine became non-fluid after exposure to the mercury lamp for only 20 seconds and after exposure to the plasma arc radiation source for only 3 seconds. In the absence of any additive the monomer did not form polymer under the same mercury arc.

Example 10

A one molar solution of methyl acrylate in t-butyl alcohol was prepared and portions thereof were blended with various additives to a total additive content of four mole percent based on the monomer. The mixtures were placed in Pyrex test tubes and irradiated by exposure for two hours to ultraviolet light of 3,500 A. from a Rayonet reactor (an ultraviolet light source available commercially; it is a group of ¾ inch diameter by 12 inch long phosphor coated low pressure mercury arc lamps). At the end of the two hours the insoluble polymer that had been produced was separated, dried, and weighed to determine the yield. It was found that neither the control containing benzophenone alone (an organic carbonyl photosensitizer) or the control containing triethylamine alone (an organic amine activator) produced any polymer; those blends containing a mixture of the benzophenone plus the organic amine always polymerized. The results are shown in Table VIII.

TABLE VIII

| | Mole percent of amine | Polymer, percent yield |
|---|---|---|
| Benzophenone, mole percent: | | |
| 4, control............... | ............... | 0 |
| ............... | 4 TEA, Control... | 0 |
| 2............... | 2 TEA............ | 27 |
| 1............... | 3 TEA............ | 23 |
| 3............... | 1 TEA............ | 26 |
| 2............... | 2 MDEOA......... | 46 |
| 1............... | 3 MDEOA......... | 42 |
| 3............... | 1 MDEOA......... | 25 |
| 2............... | 2 TEOA.......... | 49 |
| 1............... | 3 TEOA.......... | 48 |
| 3............... | 1 TEOA.......... | 30 |

NOTE.—TEA = triethylamine; MDEOA = methyldiethanolamine; TEOA = triethanolamine.

Example 11

A series of 100 percent solids coating compositions was prepared by dissolving 40 grams of acrylated epoxidized soyabean oil produced by the reaction of commercially available epoxidized soyabean oil having an oxirane content of about 7 percent with acrylic acid, 30 grams of neopentylglycol diacrylate, and 30 grams of 2-phenoxyethyl acrylate. Ten gram aliquots of the above were mixed with 0.3 gram of methyldiethanolamine and 0.2 gram of different organic carbonyl compounds. The coatings were applied to No. 37 Bonderized steel panels at a wet film thickness of about 2 mils and cured by various means. The following table sets forth the details and results.

| Organic carbonyl compound | Curing process | Sward hardness |
|---|---|---|
| Benzophenone........... | A | 22 |
| | B | 18 |
| | C | 6 |
| Thioxanthone........... | A | 28 |
| | B | 26 |
| | C | 16 |
| 2-chlorothioxanthene..... | A | 28 |
| | B | 28 |
| | C | 16 |
| 4-benzoylpyridine........ | A | 16 |
| | B | 8 |
| | C[1] | 16 |
| 3-benzoylpyridine........ | A | 24 |
| | B | 20 |
| | C | 6 |

[1] Two second exposure time.

NOTE.—A = Exposed at a distance of 16 inches to UV radiation from two 2.2 kilowatt high pressure mercury lamps for 12 seconds in air; B = As in A, but for 9 seconds under nitrogen; C = Exposed to non-ionizing high intensity predominantly continuum light radiation from a 15-kilowatt argon swirl-flow plasma arc radiation source under argon at a distance of about 6 inches from the arc for one second.

Example 12

A series of 100 percent solids coating compositions was prepared as in Example 11 using 50 grams of the reaction product of 2-hydroxyethyl acrylate (2 moles) with trimethylhexamethylene diisocyanate (1 mole), 20 grams of neopentylglycol diacrylate and 30 grams of dicyclopentenyl acrylate. To ten gram portions, the same additives were added and the coatings were applied and cured, as described in Example 11. The following table sets forth the details and results.

| Organic carbonyl Compound | Curing process | Sward hardness |
|---|---|---|
| Benzophenone........... | A | 62 |
| | B | 44 |
| | C[1] | 36 |
| Thioxanthone........... | A | 68 |
| | B | 60 |
| | C | 54 |
| 2-chlorothioxanthone..... | A | 64 |
| | B | 68 |
| | C | 46 |
| 4-benzoylpyridine........ | A | 48 |
| | B | 32 |
| | C | 16 |
| 3-benzoylpyridine........ | A | 62 |
| | B | 44 |
| | C | 12 |

[1] Two second exposure time.

NOTE.—See note to table for Example 11 for curing process descriptions.

Example 13

A series of 100 percent solids coating compositions was prepared by grinding in a ball mill 40 grams of the same acrylated epoxidized soyabean oil used in Example 11, 20 grams of neopentylglycol diacrylate, 40 grams of methylcarbamoylethyl acrylate, 40 grams of titanium dioxide pigment and 40 grams of calcium carbonate. Twenty grams aliquots of the above were mixed with 0.6 gram methyldiethanolamine and different organic carbonyl compounds in the amounts shown in the table below. The coatings were applied at a thickness of about one mil and cured, as described in Example 11. The following table sets forth the details and results.

| Organic carbonyl compound | Curing process | Sward hardness |
|---|---|---|
| 2-chlorothioxanthone (3 grams). | B[1]<br>C[2] | 8<br>6 |
| Mixture of 4 grams of benzophenone plus 0.5 grams of 4,4'-dimethylaminobenzophenone. | B[1]<br>C[2] | 8<br>8 |

[1] 8 seconds exposure time.
[2] 0.6 second exposure time.

NOTE.—See note to table for Example 11 for for curing process description.

Example 14

A 100 percent solids coating composition was prepared by grinding in a ball mill a mixture of 50 grams of the reaction product of 2-hydroxyethyl acrylate (2 moles), with trimethylhexamethylene diisocyanate (1 mole), 15 grams of neopentylglycol diacrylate, 35 grams of methylcarbamoylethyl acrylate, 40 grams of titanium dioxide pigment, 40 grams of calcium carbonate and 1.5 grams of 2 - chlorothioxanthone. To twenty gram portions of the above there was added 0.6 gram methyldiethanolamine and this final composition was coated onto steel panels at a wet film thickness of one mil and cured as described in Example 11. The following table sets forth the details and results.

| Curing process: | Sward hardness |
|---|---|
| B[1] | 16 |
| C[2] | 10 |

[1] 8 seconds exposure time.
[2] 0.6 second exposure time.

NOTE.—See footnotes to table for Example 11 for curing process descriptions.

What is claimed is:

1. A method for photopolymerization of a composition containing a polymerizable acrylyl compound of the formula:

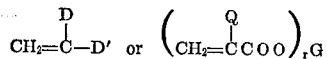

wherein D is hydrogen, methyl or chlorine;
D' is —COOD";
D" is hydrogen, cycloalkyl of 5 to 12 carbon atoms, cycloalkenyl of 5 to 12 carbon atoms, —$C_pH_{2p}$D''' or ($C_rH_{2r}$O)$_s$$C_rH_{2r+1}$;
p is an integer of 1 to 10;
r is an integer of 2 to 4;
s is an integer of 0 to 4;
D''' is hydrogen, hydroxyl, phenoxy, alkoxy of from 1 to 8 carbon atoms, methylcarbamoyl, cyano, chlorine or —ND$_2$'''';
D'''' is hydrogen or alkyl of 1 to 5 carbon atoms;
Q is hydrogen or methyl;
G is (i) a polyvalent alkylene group of the formula —$C_xH_{2x-y}$— wherein x is an integer of 2 to 8 and y is an integer of 0 to 2, (ii) a divalent ($C_rH_{2r}$O)$_t$$C_rH_{2r}$— group or (iii) a divalent ($C_rH_{2r}$COO)$_t$$C_rH_{2r}$— group wherein t is an integer of 1 to 5;

by the irradiation of said composition with ultraviolet light radiation or artificial high intensity predominantly continuum light radiation in contact with a photosensitizer composition consists essentially of from about 0.1 to about 10 weight percent each of:

(A) an organic carbonyl photosensitizer of the group of the formulas:

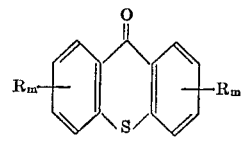

or

wherein R is hydrogen, alkyl of from 1 to 12 carbon atoms, aralkyl or alkaryl of from 7 to 15 carbon atoms, alkoxy of from 1 to 10 carbon atoms, or halogen;
Alk is alkyl of from 1 to 3 carbon atoms;
R'''' is an R group or an

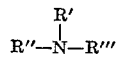

n has a value of 0 to 2;
m has a value of 0 or 1; and (B) an organic amine activator of the formula:

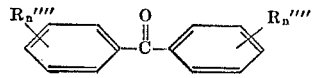

wherein R' and R", when taken singly, are hydrogen, alkyl of from 1 to 12 carbon atoms, cycloalkyl of from 3 to 10 ring carbon atoms, cycloalkenyl of from 3 to 10 ring carbon atoms, or aryl or aralkyl or alkaryl of from 6 to 12 ring carbon atoms;
R''' is an R' group with the proviso that it cannot be hydrogen and that it cannot be aryl when both R' and R" are aryl;
R" and R''', when taken together, can be diavlent alkylene of 2 to 12 carbon atoms, divalent alkylene of 3 to 10 carbon atoms, divalent alkadienylene of 5 to 10 carbon atoms, divalent alkadienylene of 5 to 10 carbon atoms, divalent alkatrienylene of 5 to 10 carbon atoms, divalent alkyleneoxyalkylene of 4 to 12 carbon atoms, or divalent alkyleneaminoalkylene of 4 to 12 carbon atoms;
wherein the ratio of the equivalent concentration of ketonic oxygen atoms in said organic carbonyl photosensitizer to the equivalent concentration of amine nitrogen atoms in said organic amine activator is from about 0.1:1 to about 10:1.

2. A method as claimed in claim 1 wherein component (A) is benzophenone and component (B) is triethanolamine.

3. A method as claimed in claim 1 wherein component (A) is 4,4'-bis(dimethylamino)benzophenone and component (B) is methyldiethylanolamine.

4. A method as claimed in claim 1 wherein component (A) is thioxanthone and component (B) is methyldiethanolamine.

5. A method as claimed in claim 1 wherein component (A) is 2-chlorothioxanthone and component (B) is methyldiethanolamine.

6. A method as claimed in claim 1 wherein component (A) is a mixture of benzophenone and 4,4'-dimethylaminobenzophenone and component (B) is methyldiethanolamine.

References Cited
UNITED STATES PATENTS 3,495,987  2/1970  Moore _____ 96—115 P
3,661,588  5/1972  Chang _____ 96—115 P PAUL LIEBERMAN, Primary Examiner R. B. TURER, Assistant Examiner U.S. Cl. X.R.

117—93.31, 132 C, 132 R; 204—159.15, 159.16, 159.13, 159.18; 260—23 EP, 23 R, 41 R, 41 B, 827, 857 G, 859 R, 872, 885, 901

PO-1050
(5/69)

UNITED STATES PATENT OFFICE
CERTIFICATE OF CORRECTION

Patent No. 3,759,807      Dated September 18, 1973

Inventor(s) C. L. Osborn and D. J. Trecker

It is certified that error appears in the above-identified patent and that said Letters Patent are hereby corrected as shown below:

Column 4, lines 69 to 74, delete in their entirety.

Column 19, line 67 "consists" should read --consisting--

Column 20, line 32 "alkylene" should read --alkenylene"

Signed and sealed this 15th day of January 1974.

(SEAL)
Attest:

EDWARD M. FLETCHER, JR.
Attesting Officer

RENE D. TEGTMEYER
Acting Commissioner of Patents